(12) United States Patent
Tatsumi et al.

(10) Patent No.: US 8,510,576 B2
(45) Date of Patent: Aug. 13, 2013

(54) SEMICONDUCTOR INTEGRATED CIRCUIT AND CONTROL METHOD OF SEMICONDUCTOR INTEGRATED CIRCUIT

(75) Inventors: Masahiro Tatsumi, Yokohama (JP); Takeshi Ishibashi, Yokohama (JP); Takashi Shimada, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 229 days.

(21) Appl. No.: 12/976,377

(22) Filed: Dec. 22, 2010

(65) Prior Publication Data

US 2011/0161691 A1 Jun. 30, 2011

(30) Foreign Application Priority Data

Dec. 24, 2009 (JP) ................................. 2009-292513

(51) Int. Cl.
*G06F 1/26* (2006.01)
(52) U.S. Cl.
USPC ................................. 713/300; 307/18; 307/24
(58) Field of Classification Search
USPC ............................... 713/300, 330; 307/18, 24
See application file for complete search history.

(56) References Cited

U.S. PATENT DOCUMENTS

| 7,012,454 | B2 | 3/2006 | Matsui et al. |
| 7,398,406 | B2 | 7/2008 | Naruse et al. |
| 7,545,165 | B2 * | 6/2009 | Barrows et al. ................. 326/33 |
| 2007/0028125 | A1 | 2/2007 | Kitanaka |
| 2008/0201584 | A1 | 8/2008 | Tatsumi |
| 2009/0144578 | A1 | 6/2009 | Tatsumi |

FOREIGN PATENT DOCUMENTS

| JP | 2004-13820 A | 1/2004 |
| JP | 2005-122374 A | 5/2005 |
| JP | 2005-249526 A | 9/2005 |
| JP | 2005-339310 A | 12/2005 |
| JP | 2007-34839 A | 2/2007 |
| JP | 2008-204271 A | 9/2008 |
| JP | 2009-134577 | 6/2009 |

* cited by examiner

*Primary Examiner* — Albert Wang
(74) *Attorney, Agent, or Firm* — Fujisu Patent Center

(57) ABSTRACT

A semiconductor integrated circuit includes: a plurality of domains each supplied power supply voltage from corresponding one of a plurality of power supply units; and a plurality of operation control units each connected to corresponding one of the plurality of domains and controlling an operational state of the corresponding domain, wherein each of the domain transmits a operation change request to the corresponding operation control unit, the operation change request representing a request for a change of the operational state with a change in current value of the domain, and the operation control unit calculates a current change rate of the domain resulted from the change of operational state upon receiving the operation change request, and transmits a response signal approving the change of operational state to the corresponding domain in case of the current change rate is within a specified value.

7 Claims, 15 Drawing Sheets

FIG. 7

| CURRENT VALUE [mA] | | | | | |
|---|---|---|---|---|---|
| REQUESTED OPERATION MODE | 1/1 | 1/2 | 1/4 | 1/8 | 0/1 |
| MODULE A | 100 | 50 | 25 | 12.5 | 0 |
| MODULE B | 80 | 40 | 20 | 10 | 0 |
| MODULE C | 60 | 30 | 15 | 7.5 | 0 |
| MODULE D | 20 | 10 | 5 | 2.5 | 0 |

↑ OPERATION STOP

FIG. 15

| | CURRENT VALUE [mA] | | | | |
|---|---|---|---|---|---|
| REQUESTED OPERATION MODE | 1/1 | 1/2 | 1/4 | 1/8 | 0/1 |
| MODULE E | 100 | 50 | 25 | 12.5 | 0 |
| MODULE F | 60 | 30 | 15 | 7.5 | 0 |

↑ OPERATION STOP

SEMICONDUCTOR INTEGRATED CIRCUIT AND CONTROL METHOD OF SEMICONDUCTOR INTEGRATED CIRCUIT

CROSS-REFERENCE TO RELATED APPLICATION

This application is based upon and claims the benefit of priority from the prior Japanese Patent Application No. 2009-292513 filed on Dec. 24, 2009, the entire contents of which are incorporated herein by reference.

FIELD

This embodiments discussed herein are related to a semiconductor integrated circuit supplied with power supply voltages from a plurality of power supplies, and a control method of the semiconductor integrated circuit.

BACKGROUND

In recent years, to reduce power consumption, many semiconductor integrated circuits are supplied with power supply voltages from different power supplies in units of domains divided for a plurality of functional modules. For example, if a semiconductor integrated circuit includes two domains D1 and D2, the domain D1 is supplied with a power supply voltage V1 from a power supply S1, and the domain D2 is supplied with a power supply voltage V2 from a power supply S2 different from the power supply S1.

Herein, if the power supply voltages V1 and V2 have different values, the respective clock phases in the domains D1 and D2 differ from each other in timing in the exchange of signals between the domains D1 and D2, and thus accurate exchange of signals may be prevented. In this case, therefore, the exchange of signals between the domains D1 and D2 is performed via an asynchronous bridge unit which performs signal level conversion and clock domain crossing.

Meanwhile, if the power supply voltages V1 and V2 have the same value, the exchange of signals is performed with the asynchronous bridge unit bypassed. Thus, data transmission may be performed more efficiently than in the exchange of signals via the asynchronous bridge unit. Even in this case, however, if the clock frequency of a power supply is substantially changed, for example, the power supply voltage may fluctuate owing to a steep current fluctuation occurring in the power supply. In that case, the respective values of the power supply voltages V1 and V2 differ from each other, and thus it is difficult to perform the exchange of signals by bypassing the asynchronous bridge unit. In view of this, describes a technique is described which, when performing the exchange of signals by bypassing the asynchronous bridge unit, supplies two domains D1 and D2 with power supply voltages from a single power supply S1 (or S2) (see, e.g., Japanese Laid-open Patent Publication No. 2008-204271).

SUMMARY

According to an aspect of the embodiment, a semiconductor integrated circuit includes: a plurality of domains each supplied power supply voltage from corresponding one of a plurality of power supply units; and a plurality of operation control units each connected to corresponding one of the plurality of domains and controlling an operational state of the corresponding domain, wherein each of the domain transmits a operation change request to the corresponding operation control unit, the operation change request representing a request for a change of the operational state with a change in current value of the domain, and the operation control unit calculates a current change rate of the domain resulted from the change of operational state upon receiving the operation change request, and transmits a response signal approving the change of operational state to the corresponding domain in case of the current change rate is within a specified value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an example of a table representing the relationship between operation modes of modules in a domain and current values;

FIG. 15 is an example of a table representing the relationship between operation modes of modules in a domain and current values.

DESCRIPTION OF EMBODIMENTS

Examples of embodiments will be described below with reference to the drawings.

[First Embodiment]

A control method of a semiconductor integrated circuit according to a first embodiment will be described.

An example of the configuration of the semiconductor integrated circuit according to the first embodiment will be first described with reference to FIG. 1.

Figure 1:
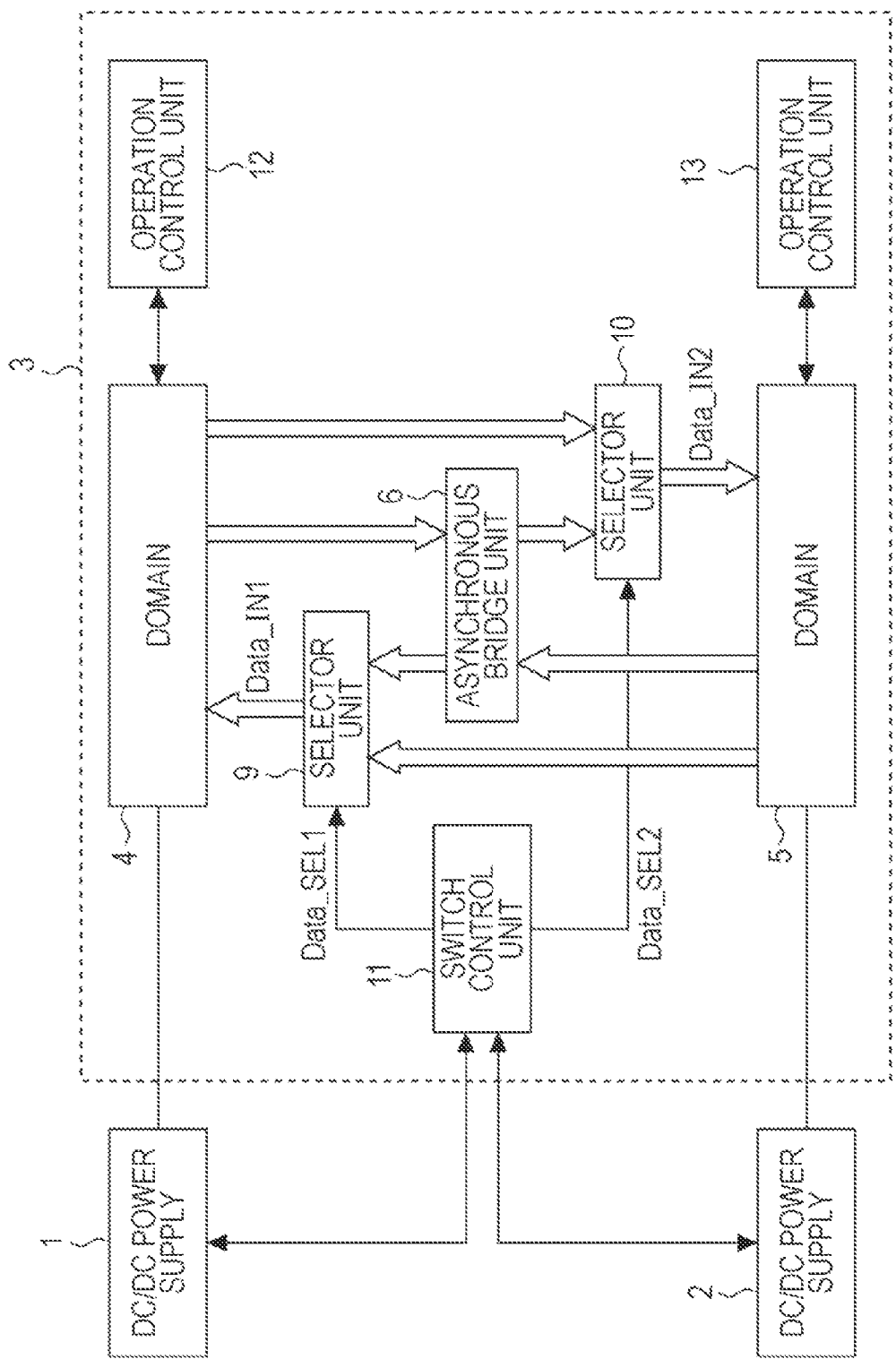
FIG. 1 is a diagram illustrating an example of the configuration of a semiconductor integrated circuit according to a first embodiment.

As illustrated in FIG. 1, a semiconductor integrated circuit 3 according to the first embodiment includes domains 4 and 5, an asynchronous bridge unit 6, selector units 9 and 10, a switch control unit 11, and operation control units 12 and 13. Herein, a domain refers to a unit of circuit in the semiconductor integrated circuit 3 including one or more modules, such as circuit elements. The semiconductor integrated circuit 3 is supplied with power supply voltages from different power supplies in domain units. In the example of FIG. 1, the domain 4 is supplied with a power supply voltage from a DC/DC (Direct Current/Direct Current) power supply 1, and the domain 5 is supplied with a power supply voltage from a DC/DC power supply 2.

The domains 4 and 5 perform transmission and reception of signals therebetween. The selector units 9 and 10 and the asynchronous bridge unit 6 are provided on paths for transmitting and receiving signals between the domains 4 and 5. The selector unit 9 transmits to the domain 4 a signal Data_IN1 from the domain 5, and the selector unit 10 transmits to the domain 5 a signal Data_IN2 from the domain 4.

On the basis of detection signals from the DC/DC power supplies 1 and 2, the switch control unit 11 transmits control signals Data_SEL1 and Data_SEL2 to the selector units 9 and 10, respectively, to thereby control the selector units 9 and 10. The switch control unit 11 controls the selector units 9 and 10 to thereby switch the path for transmitting and receiving signals between the domains 4 and 5 between a path via the asynchronous bridge unit 6 and a path bypassing the asynchronous bridge unit 6. The asynchronous bridge unit 6 performs clock adjustment.

Further, in the semiconductor integrated circuit 3, each of the domains is provided with an operation control unit for controlling the operational state of the domain. For example, the operation control unit 12 for controlling the operational state of the domain 4 and the operation control unit 13 for controlling the operational state of the domain 5 are provided. Herein, the operation control units 12 and 13 are realized by a program executed by an MPU (Micro Processing Unit), for example.

Figure 2:
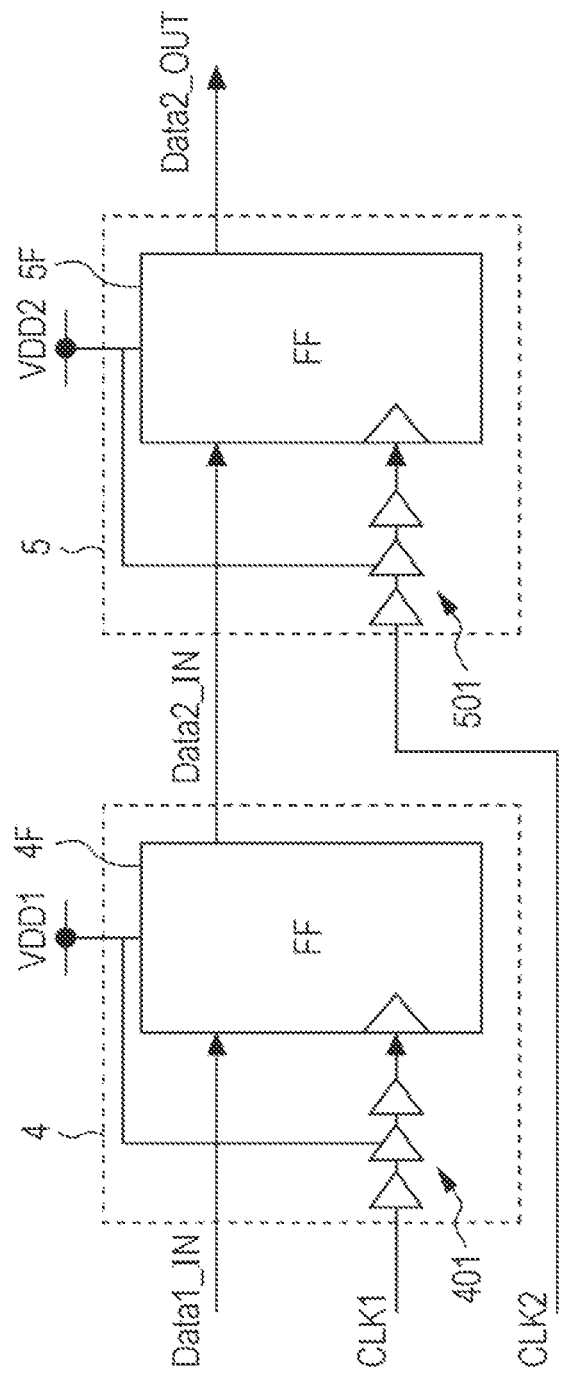
FIG. 2 is a diagram illustrating an example of transmission and reception of signals between domains.

A reason for providing the asynchronous bridge unit 6 will now be briefly described with reference to FIG. 2. FIG. 2 illustrates, as an example of transmission and reception of signals between the domains 4 and 5 in the absence of the asynchronous bridge unit 6, an example of transmission and reception of signals between flip-flops (FF).

As illustrated in FIG. 2, the domains 4 and 5 include flip-flops 4F and 5F, respectively. Data1_IN and CLK1 respectively represent data and clock input to the flip-flop 4F of the domain 4, and Data2_IN and CLK2 respectively represent data and clock input to the flip-flop 5F of the domain 5. As illustrated in FIG. 2, delay buffers 401 and 501 are inserted for the clocks CLK1 and CLK2, respectively, to adjust timing. The data Data2_IN input to the flip-flop 5F of the domain 5 is output from the flip-flop 4F of the domain 4. The flip-flop 5F outputs data Data2_OUT.

VDD1 and VDD2 represent power supply voltages supplied to the domains 4 and 5, respectively. The power supply voltage VDD1 is supplied to the domain 4 from the DC/DC power supply 1. For example, the power supply voltage VDD1 is supplied to the flip-flop 4F and the delay buffer 401. Meanwhile, the power supply voltage VDD2 is supplied to the domain 5 from the DC/DC power supply 2. For example, the power supply voltage VDD2 is supplied to the flip-flop 5F and the delay buffer 501.

Figure 3:
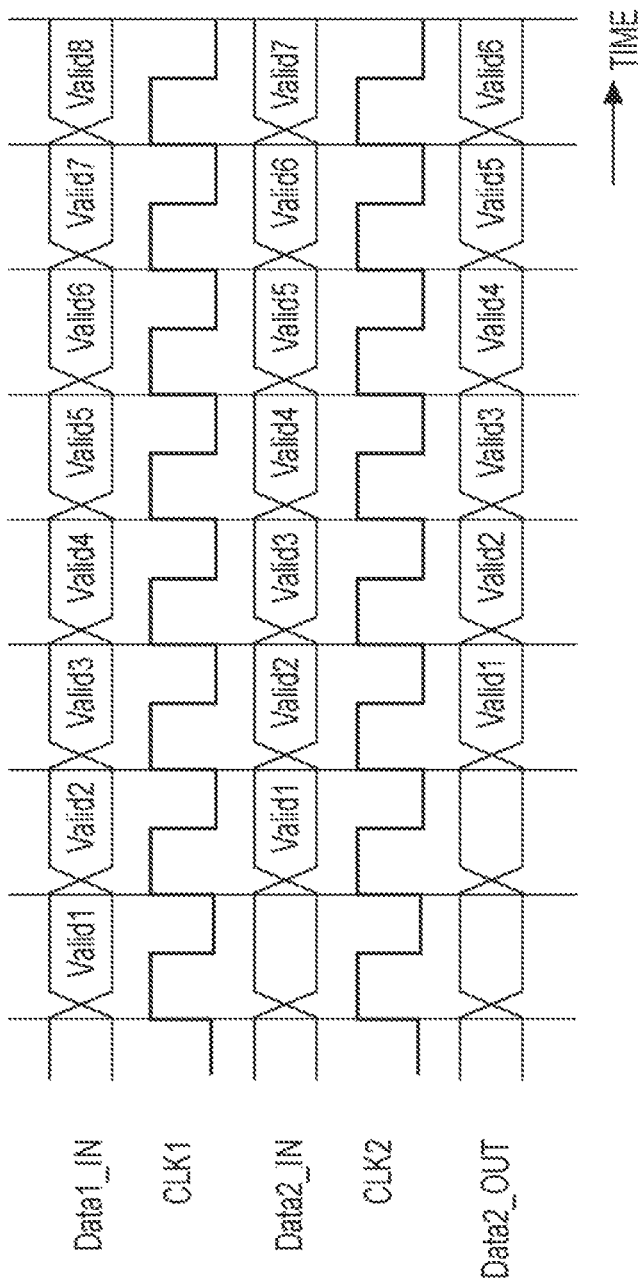
FIG. 3 is a timing chart for explaining transmission and reception of signals performed when power supply voltages have the same value.

FIG. 3 is a timing chart for explaining transmission and reception of signals between the domains 4 and 5 in FIG. 2 performed when the power supply voltages VDD1 and VDD2 have the same value. In FIG. 3, "Valid" indicates that data has no error and is normal. As illustrated in FIG. 3, if the power supply voltages VDD1 and VDD2 used in the domains 4 and 5 are the same, the data Data1_IN input to the domain 4 is output normally and without an error from the flip-flop 5F as the data Data2_OUT. In other words, if the potential difference |VDD1−VDD2| between the domains 4 and 5 does not exceed the upper limit potential difference, the data Data1_IN input to the domain 4 is output normally and without an error from the flip-flop 5F as the data Data2_OUT. Herein, the upper limit potential difference refers to the upper limit value of the potential difference, with which the power supply voltages VDD1 and VDD2 are regarded as voltages of the same value, more specifically, the upper limit value of the potential difference between the domains, with which the transmission and reception of signals may be performed without an error.

Figure 4:
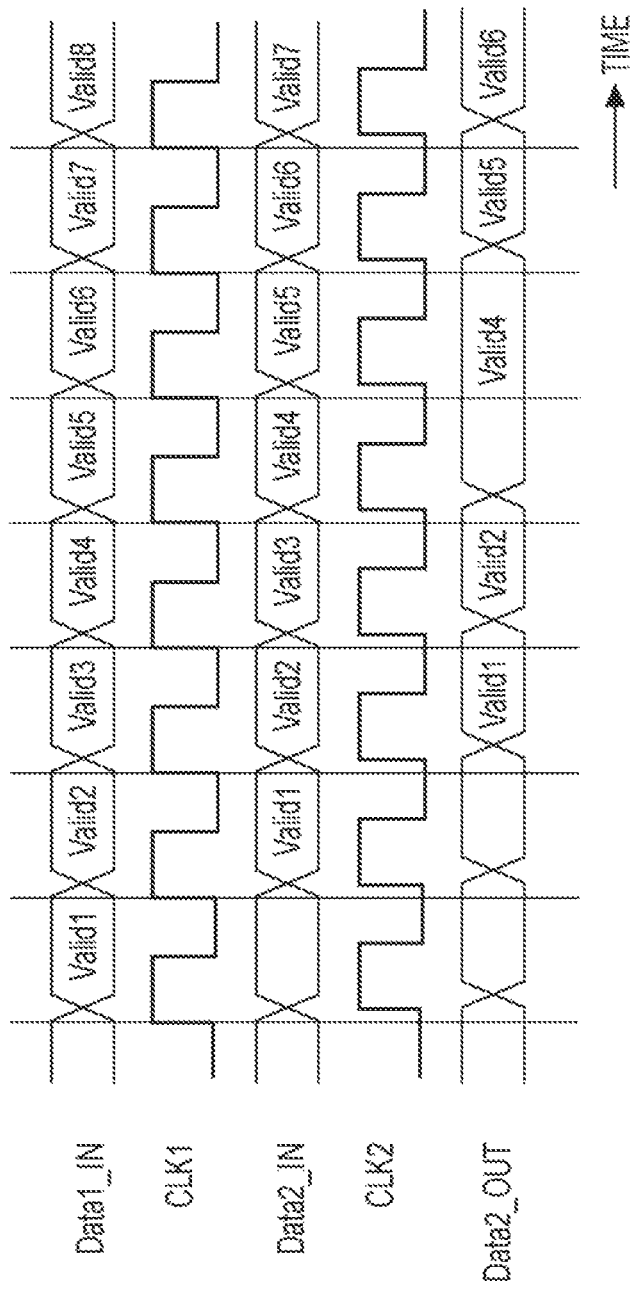
FIG. 4 is a timing chart for explaining transmission and reception of signals performed when power supply voltages have mutually different values.

FIG. 4 is a timing chart for explaining transmission and reception of signals between the domains 4 and 5 in FIG. 2 performed when the power supply voltages VDD1 and VDD2 have different values. If the power supply voltages VDD1 and VDD2 used in the domains 4 and 5 have mutually different values, a difference in clock timing is generated between the delay buffers 401 and 501. That is, the phase timing does not match between the clocks CLK1 and CLK2. As illustrated in FIG. 4, therefore, the data Data1_IN input to the flip-flop 4F fails to be normally output from the flip-flop 5F as the data Data2_OUT. In other words, if the potential difference |VDD1−VDD2| between the domains 4 and 5 exceeds the upper limit potential difference, the data Data1_IN input to the flip-flop 4F fails to be normally output from the flip-flop 5F.

For the above-described reason, the transmission and reception path between the domains 4 and 5 is provided with the asynchronous bridge unit 6 which performs clock adjustment. With the transmission and reception of signals performed via the asynchronous bridge unit 6, it is possible to transmit and receive data without an error, even if the respective voltages supplied to the domains 4 and 5 have mutually different values. Meanwhile, the communication via the asynchronous bridge unit 6 requires extra clocks. If the respective voltages supplied to the domains 4 and 5 have the same value, therefore, data transmission may be performed more efficiently by the transmission and reception of signals performed with the asynchronous bridge unit 6 bypassed.

If the respective voltages supplied to the domains 4 and 5 have mutually different values, therefore, the switch control unit 11 controls the selector units 9 and 10 to perform the transmission and reception of signals between the domains 4 and 5 via the asynchronous bridge unit 6. Meanwhile, if the respective voltages supplied to the domains 4 and 5 have the same value, the switch control unit 11 controls the selector units 9 and 10 to perform the transmission and reception of signals between the domains 4 and 5 by bypassing the asynchronous bridge unit 6.

An example of the configuration of the switch control unit 11 will now be described with reference to FIG. 5.

Figure 5:
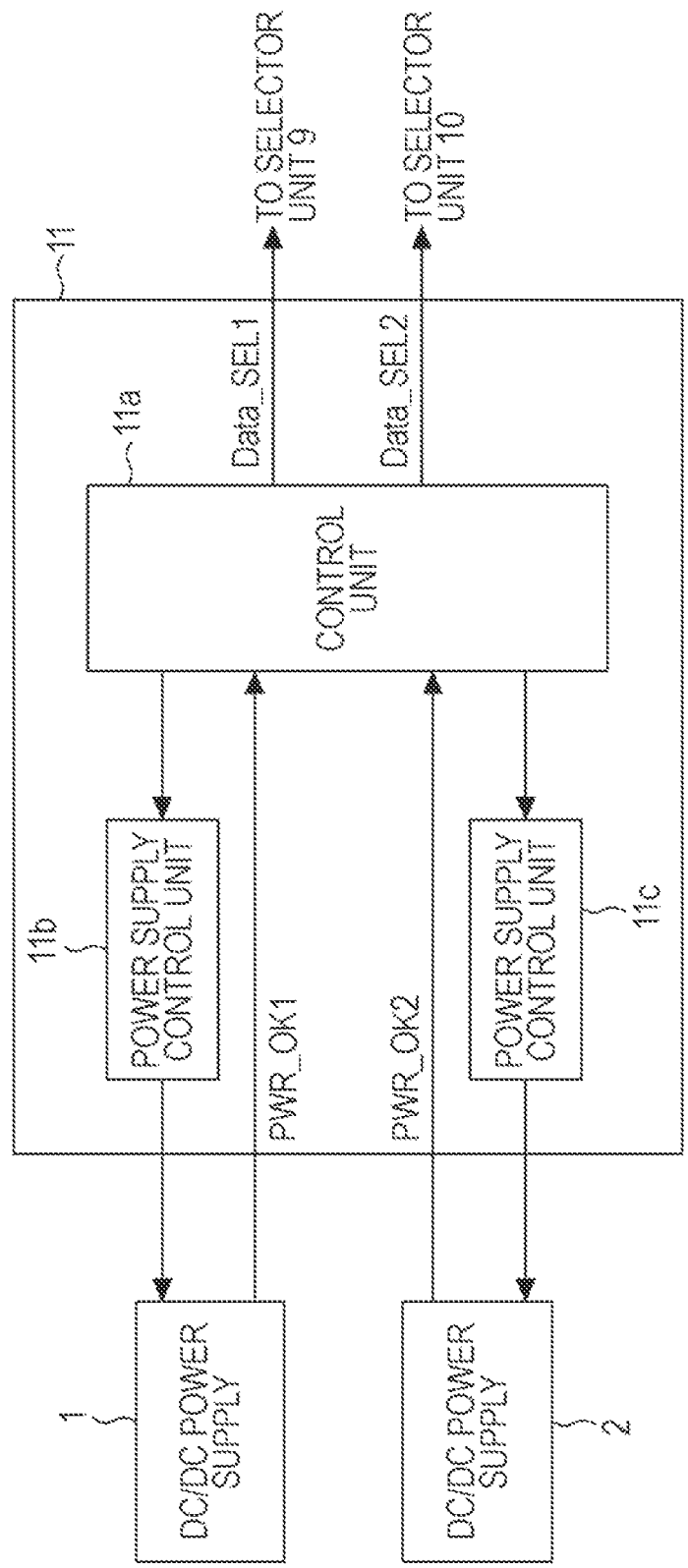
FIG. 5 is a diagram illustrating an example of the configuration of a switch control unit.

As illustrated in FIG. 5, the switch control unit 11 includes a control unit 11a and power supply control units 11b and 11c. The power supply control unit 11b controls the DC/DC power supply 1, and the power supply control unit 11c controls the DC/DC power supply 2. The control unit 11a instructs the power supply control units 11b and 11c to set the power supply voltages thereof to respective target voltages. In accordance with the instruction from the control unit 11a, the power supply control units 11b and 11c transmit to the DC/DC power supplies 1 and 2 control signals for controlling the power supply voltages output by the DC/DC power supplies 1 and 2 to the target voltages. The DC/DC power supplies 1 and 2 adjust the power supply voltages output therefrom to the target voltages, and thereafter transmit to the control unit 11a voltage adjustment completion notifications PWR_OK1 and PWR_OK2 representing the completion of the voltage adjustment. Upon receipt of the voltage adjustment completion notifications PWR_OK1 and PWR_OK2 from the DC/DC power supplies 1 and 2, the control unit 11a transmits the control signals Data_SEL1 and Data_SEL2 to the selector units 9 and 10, respectively, in accordance with the target voltages, to thereby control the selector units 9 and 10.

The configuration of the switch control unit 11 is not limited to the configuration in which the control unit 11a receives the completion notifications from the DC/DC power supplies 1 and 2. The above configuration may be modified such that the power supply control units 11b and 11c transmit the completion notifications to the control unit 11a. For example, each of the power supply control units 11b and 11c may include a timer and transmit the completion notification to the control unit 11a when the lapse of a specified time since the transmission of the control signal to the corresponding one of the DC/DC power supplies 1 and 2 is detected by the timer.

As described above, in the semiconductor integrated circuit 3, if the respective voltages supplied to the domains 4 and 5 have mutually different values, the transmission and reception of signals between the domains 4 and 5 is performed via the asynchronous bridge unit 6. Meanwhile, if the respective voltages supplied to the domains 4 and 5 have the same value, the transmission and reception of signals between the domains 4 and 5 is performed with the asynchronous bridge unit 6 bypassed.

However, if the clock frequency of a power supply is substantially changed, for example, the power supply voltage may fluctuate owing to a steep current fluctuation occurring in the power supply, even if the respective voltages supplied to the domains 4 and 5 have the same value. In this case, the values of the respective voltages supplied to the domains 4 and 5 differ from each other. In other words, the potential difference between the domains 4 and 5 exceeds the upper limit potential difference. As a result, it is difficult to perform the transmission and reception of signals by bypassing the asynchronous bridge unit 6.

In view of this, the semiconductor integrated circuit 3 according to the first embodiment is configured such that the operation control units 12 and 13 monitor the respective current fluctuations in the domains 4 and 5. For example, upon receipt from the domains 4 and 5 of a request for a change in operation involving a change in current value, such the start or stop of the operation of a module, the operation control units 12 and 13 determine whether or not to approve the operation change request, and send a response to the domains 4 and 5. A specific control method will be described below.

Figure 6:
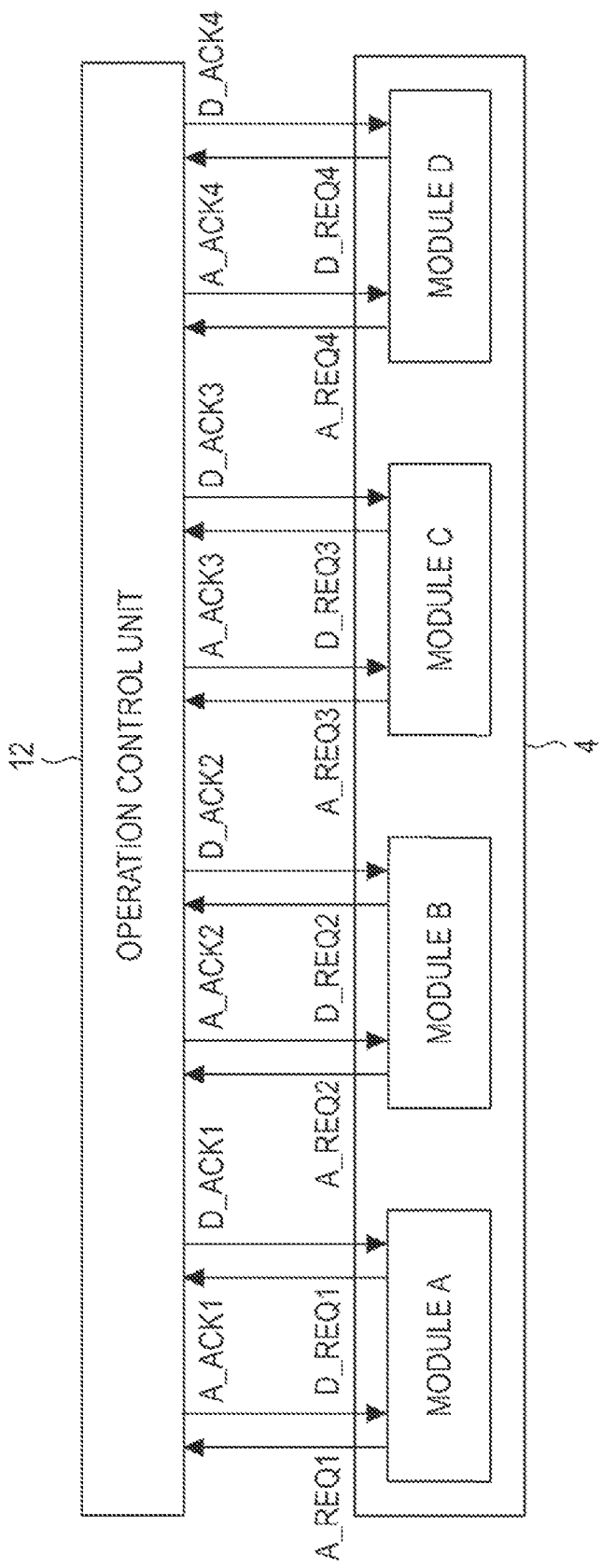
FIG. 6 is a diagram illustrating an example of the connection configuration between an operation control unit and a domain.

FIG. 6 is a diagram illustrating an example of the connection configuration between the operation control unit 12 and the domain 4.

In the example illustrated in FIG. 6, the domain 4 includes four modules A, B, C, and D. Each of the modules A, B, C, and D in the domain 4 transmits to the operation control unit 12 a request signal representing a request for a change in operation, such as the start or stop of the operation. Further, each of the modules A, B, C, and D receives from the operation control unit 12 a response signal representing a response to the operation change request.

For example, when the module A starts the operation thereof, the module A transmits to the operation control unit 12 a request signal A_REQ1 representing an operation start request, and receives from the operation control unit 12 a response signal A_ACK1 responding thereto. Further, when the module A stops the operation thereof, the module A transmits to the operation control unit 12 a request signal D_REQ1 representing an operation stop request, and receives from the operation control unit 12 a response signal D_ACK1 responding thereto. Similarly, when the modules B, C, and D start the operation thereof, the modules B, C, and D transmit to the operation control unit 12 request signals A_REQ2, A_REQ3, and A_REQ4 each representing an operation start request, and receive from the operation control unit 12 response signals A_ACK2, A_ACK3, and A_ACK4 responding thereto. Further, when the modules B, C, and D stop the operation thereof, the modules B, C, and D transmit to the operation control unit 12 request signals D_REQ2, D_REQ3, and D_REQ4 each representing an operation stop request, and receive from the operation control unit 12 response signals D_ACK2, D_ACK3, and D_ACK4 responding thereto.

In the following, the numeral part of the sign representing a signal will be omitted, if the distinction between the modules is not made. For example, if the distinction between the modules is not made, a request signal requesting for the start of an operation will be represented as "A_REQ," and a response signal responding thereto will be represented as "A_ACK." Further, a request signal requesting for the stop of an operation will be represented as "D_REQ," and a response signal responding thereto will be represented as "D_ACK."

When transmitting to the operation control unit 12 the request signal A_REQ or D_REQ representing the operation change request, each of the modules in the domain 4 transmits the request signal by including therein the information of the operation mode for the operation change. In the following, the operation mode will be referred to as the "requested operation mode."

Upon receipt of a request signal A_REQ or D_REQ representing an operation change request from each of the modules in the domain 4, the operation control unit 12 calculates the current value of the entire domain 4. Then, on the basis of the requested operation mode included in the received request signal A_REQ or D_REQ, the operation control unit 12 calculates the current change rate of the entire domain 4 resulting from the operation change. The operation control unit 12 determines whether or not the current change rate does not exceed a specified value. Then, if the operation control unit 12 determines that the current change rate does not exceed the specified value, the operation control unit 12 transmits to the module a response signal A_ACK or D_ACK approving the operation change request with the requested operation mode. Meanwhile, if the operation control unit 12 determines that the current change rate exceeds the specified value, the operation control unit 12 transmits to the module a response signal A_ACK or D_ACK disapproving the operation change request with the requested operation mode. The specified value is, for example, the allowable current change rate of the DC/DC power supply 1. Herein, the allowable current change rate refers to a current change rate with which, when the power supply voltages supplied to a plurality of domains have the same value, the transmission and reception of signals between the plurality of domains may be accurately performed, even if the asynchronous bridge unit 6 is bypassed. In other words, the allowable current change rate refers to a current change rate capable of suppressing the fluctuations of the power supply voltages and maintaining the potential difference between the domains 4 and 5 not to exceed the upper limit potential difference.

In the following, as an example of the request for a change in operation involving a change in current value, an example of operations of the operation control unit 12 and the modules in the domain 4 will be described, with reference to FIG. 7, for each of operation start processing and operation stop processing of a module.

FIG. 7 is an example of a table representing the relationship between the operation modes of the modules in the domain 4 and the current values. Herein, each of the requested operation modes is represented as a clock frequency ratio. For example, when the requested operation mode is set to 1/1, the module A operates with a current value of 100 (mA). Meanwhile, when the requested operation mode is set to 1/2, the module A operates with a current value of 100/2=50 (mA) corresponding to a clock frequency ratio of 1/2. The requested operation mode 1/1 is an operation mode used when a module completes the start of the operation thereof, and the requested operation mode 0/1 is an operation mode used when a module completes the stop of the operation thereof. As described above, in the example illustrated in FIG. 7, the domain 4 changes the current value by dividing the clock frequency. Accordingly, it is easy to achieve a match in clock timing between the domains while changing the current value.

As an example of operation start processing in which a module starts the operation thereof, description will be first made of an example in which the module A starts the operation thereof when only the module C is operating in the domain 4.

To start the operation, the module A first transmits to the operation control unit 12 a request signal A_REQ1 representing an operation start request with a requested operation mode of 1/1. Upon receipt of the request signal A_REQ1, the operation control unit 12 calculates the current change rate of the domain 4. In this state, only the module C is operating in the domain 4. Therefore, if the current value of the module C is 60 (mA), the current value of the entire domain 4 is 60 (mA). Meanwhile, the requested operation mode of the module A is 1/1. If the requested operation mode is approved, therefore, the current value of the entire domain 4 after the start of the operation of the module A is 60+100=160 (mA). Accordingly, the current change rate of the entire domain 4 between before and after the start of the operation of the module A is calculated as 160/60=2.67, i.e., 267(%).

Herein, if the DC/DC power supply 1 for supplying a power supply voltage to the domain 4 has an allowable current change rate of 200%, for example, the current change rate of the domain 4 exceeds the allowable current change rate of the DC/DC power supply 1. In this case, the potential difference between the domains 4 and 5 may exceed the upper limit potential difference owing to an increase in the power supply voltage output from the DC/DC power supply 1. Therefore, the operation control unit 12 transmits to the module A a response signal A_ACK1 disapproving the start of the operation.

Upon receipt of the response signal A_ACK1 disapproving the start of the operation, the module A then transmits to the operation control unit 12 a request signal A_REQ1 with a requested operation mode of 1/2. Upon receipt of the request signal A_REQ1, the operation control unit 12 again calculates the current change rate of the domain 4. As previously described, only the module C is operating in the domain 4 in this state. Therefore, the current value of the entire domain 4 is 60 (mA). Meanwhile, the requested operation mode of the module A is 1/2. If the requested operation mode is approved, therefore, the current value of the entire domain 4 after the start of the operation of the module A is 60+50=110 (mA). Accordingly, the current change rate of the entire domain 4 between before and after the start of the operation of the module A is calculated as 110/60=1.83, i.e., 183(%).

As previously described, the allowable current change rate of the DC/DC power supply 1 is 200%. Thus, the current change rate of the domain 4 in this case does not exceed the allowable current change rate of the DC/DC power supply 1. In this case, therefore, there is no increase in the power supply voltage output from the DC/DC power supply 1. Thus, the potential difference between the domains 4 and 5 does not exceed the upper limit potential difference. Therefore, the operation control unit 12 transmits to the module A a response signal A_ACK1 approving the start of the operation. Upon receipt of the response signal A_ACK1 approving the start of the operation, the module A starts the operation thereof in the approved operation mode of 1/2. That is, the module A starts the operation thereof with a current value of 50 (mA).

Then, the module A again transmits to the operation control unit 12 a request signal A_REQ1 with a requested operation mode of 1/1. Upon receipt of the request signal A_REQ1, the operation control unit 12 again calculates the current change rate of the domain 4. In this state, the modules A and C are operating in the domain 4. Therefore, the current value of the entire domain 4 is 60+50=110 (mA). Meanwhile, the requested operation mode of the module A is 1/1. If the requested operation mode is approved, therefore, the current value of the entire domain 4 after the change in operation mode of the module A is 60+100=160 (mA). Accordingly, the current change rate of the entire domain 4 between before and after the change in operation mode of the module A is calculated as 160/110=1.45, i.e., 145(%).

The allowable current change rate of the DC/DC power supply 1 is 200%. Thus, the current change rate of the domain 4 in this case does not exceed the allowable current change rate of the DC/DC power supply 1. Therefore, the operation control unit 12 transmits to the module A a response signal A_ACK1 approving the start of the operation in the requested operation mode. Upon receipt of the response signal A_ACK1, the module A changes the clock frequency ratio to the approved requested operation mode of 1/1. That is, the module A changes the current value from 50 (mA) to 100 (mA). The module A thus operates in the operation mode of 1/1, i.e., with the current value of 100 (mA), and the operation start processing of the module A is completed.

In the above-described example, description has been made of an example of the operation start processing of the module A. The operation start processing of the other modules B, C, and D is also performed in a similar manner.

Figure 8:
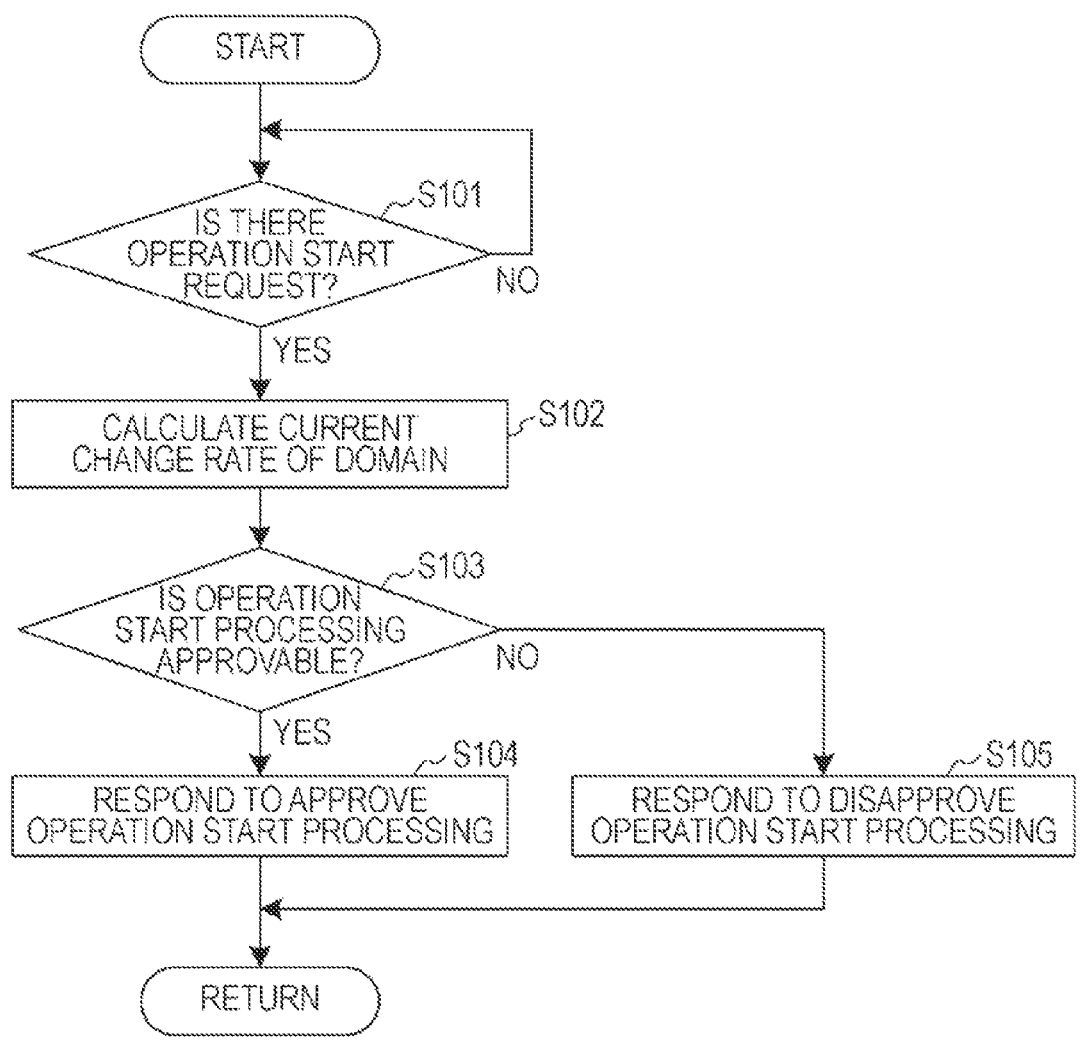
FIG. 8 is a flowchart illustrating control processing by the operation control unit performed in operation start processing of a module.

Control processing by the operation control unit 12 performed in the operation start processing of each of the modules will now be described with reference to the flowchart illustrated in FIG. 8.

At Step S101, the operation control unit 12 first determines whether or not a request signal A_REQ representing an operation start request has been received from any of the modules in the domain 4. If the operation control unit 12 determines that the request signal A_REQ has not been received from any of the modules (NO at Step S101), the operation control unit 12 repeats the process of Step S101 until the receipt of the request signal A_REQ. Meanwhile, if the operation control unit 12 determines that the request signal A_REQ has been received from any of the modules (YES at Step S101), the operation control unit 12 proceeds to the process of Step S102.

At Step S102, the operation control unit 12 calculates the current change rate of the domain 4. For example, the operation control unit 12 calculates the current change rate of the domain 4 resulting from the approval of the requested operation mode included in the request signal A_REQ. At subsequent Step S103, the operation control unit 12 determines, on the basis of the calculated current change rate, whether or not to approve the start of the operation in the requested operation mode. For example, the operation control unit 12 determines whether or not the calculated current change rate does not exceed the allowable current change rate.

If the operation control unit 12 determines at Step S103 that the calculated current change rate does not exceed the allowable current change rate, the operation control unit 12 approves the operation start processing in the requested operation mode (YES at Step S103), and proceeds to the process of Step S104. At Step S104, the operation control unit 12 transmits to the module which has transmitted the request signal A_REQ a response signal A_ACK approving the operation start processing, and thereafter returns to the present control processing. Meanwhile, if the operation control unit 12 determines at Step S103 that the calculated current change rate exceeds the allowable current change rate, the operation control unit 12 disapproves the operation start processing in the requested operation mode (NO at Step S103), and proceeds to the process of Step S105. At Step S105, the operation control unit 12 transmits to the module which has transmitted the request signal A_REQ a response signal A_ACK disapproving the operation start processing, and thereafter returns to the present control processing. The module having the operation start request disapproved by the operation control unit 12 changes the requested operation mode, and again transmits the operation start request to the operation control unit 12.

In the operation start processing of each of the modules in the domain 4, the operation control unit 12 thus controls the operation mode of the module such that the current change rate of the entire domain 4 does not exceed the allowable current change rate of the DC/DC power supply 1. With this configuration, it is possible to suppress the fluctuation of the power supply voltage. As a result, the potential difference between the domains 4 and 5 is prevented from exceeding the upper limit potential difference.

Subsequently, as an example of operation stop processing in which a module stops the operation thereof, description will be made of an example in which the module A stops the operation thereof when the modules A and C are operating in the domain 4.

To stop the operation, the module A first transmits to the operation control unit 12 a request signal D_REQ1 representing an operation stop request with a requested operation mode of 0/1 (see FIG. 7). Upon receipt of the request signal D_REQ1, the operation control unit 12 calculates the current change rate of the domain 4. In this state, the modules A and C are operating in the domain 4. Therefore, the current value of the entire domain 4 is 60+100=160 (mA). Meanwhile, the requested operation mode of the module A is 0/1. Therefore, if the requested operation mode is approved, i.e., if the operation of the module A is stopped, the current value of the entire domain 4 is 60+0=60 (mA). Accordingly, the current change rate of the entire domain 4 between before and after the stop of the operation of the module A is calculated as 160/60=2.67, i.e., 267(%).

As previously described, the allowable current change rate of the DC/DC power supply 1 is 200%. Therefore, the current change rate of the domain 4 exceeds the allowable current change rate of the DC/DC power supply 1. In this case, the potential difference between the domains 4 and 5 may exceed the upper limit potential difference owing to a reduction in the power supply voltage output from the DC/DC power supply 1. Therefore, the operation control unit 12 transmits to the module A a response signal D_ACK1 disapproving the stop of the operation.

Upon receipt of the response signal D_ACK1 disapproving the stop of the operation, the module A then transmits to the operation control unit 12 a request signal D_REQ1 with a requested operation mode of 1/2. Upon receipt of the request signal D_REQ1, the operation control unit 12 again calculates the current change rate of the domain 4. As previously described, the modules A and C are operating in the domain 4 in this state. Therefore, the current value of the entire domain 4 is 160 (mA). Meanwhile, the requested operation mode of the module A is 1/2. If the requested operation mode is approved, therefore, the current value of the entire domain 4 after the change in operation mode of the module A is 160−50=110 (mA). Accordingly, the current change rate of the entire domain 4 between before and after the change in operation mode of the module A is calculated as 160/110=1.45, i.e., 145(%).

The allowable current change rate of the DC/DC power supply 1 is 200%. Thus, the current change rate of the domain 4 in this case does not exceed the allowable current change rate of the DC/DC power supply 1. In this case, therefore, there is no reduction in the power supply voltage output from the DC/DC power supply 1, and thus the potential difference between the domains 4 and 5 does not exceed the upper limit potential difference. Accordingly, the operation control unit 12 transmits to the module A a response signal D_ACK1 approving the operation stop request. Upon receipt of the response signal D_ACK1, the module A changes the clock frequency ratio to the approved requested operation mode of 1/2.

Then, the module A again transmits to the operation control unit 12 a request signal D_REQ1 with a requested operation mode of 0/1. Upon receipt of the request signal D_REQ1, the operation control unit 12 again calculates the current change rate of the domain 4. In this state, the module A is operating in the operation mode of 1/2 and the module C is operating in the operation mode of 1/1 in the domain 4. Therefore, the current value of the entire domain 4 is 50+60=110 (mA). Meanwhile, the requested operation mode of the module A is 0/1. Therefore, if the requested operation mode is approved, i.e., if the operation of the module A is stopped, the current value of the entire domain 4 is 60+0=60 (mA). Accordingly, the current change rate of the entire domain 4 between before and after the stop of the operation of the module A is calculated as 110/60=1.83, i.e., 183(%).

The allowable current change rate of the DC/DC power supply 1 is 200%. Thus, the current change rate of the domain 4 in this case does not exceed the allowable current change rate of the DC/DC power supply 1. Therefore, the operation control unit 12 transmits to the module A a response signal D_ACK1 approving the stop of the operation. Upon receipt of the response signal D_ACK1 approving the stop of the operation, the module A stops the operation thereof. Thereby, the operation stop processing of the module A is completed.

In the above-described example, description has been made of an example of the operation stop processing of the module A. The operation stop processing of the other modules B, C, and D is also performed in a similar manner.

Figure 9:
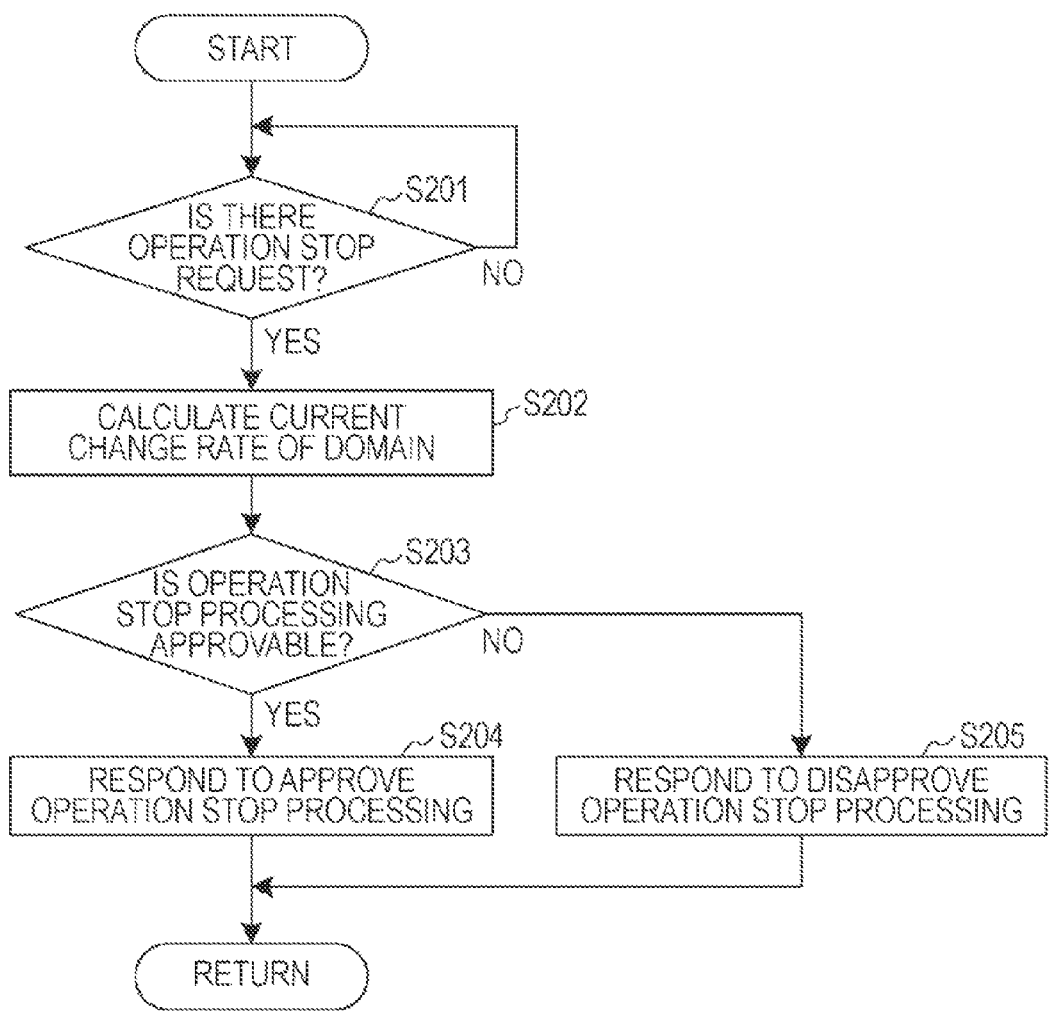
FIG. 9 is a flowchart illustrating control processing by the operation control unit performed in operation stop processing of a module.

Control processing by the operation control unit 12 performed in the operation stop processing of each of the modules will now be described with reference to the flowchart illustrated in FIG. 9.

At Step S201, the operation control unit 12 first determines whether or not a request signal D_REQ representing an operation stop request has been received from any of the modules in the domain 4. If the operation control unit 12 determines that the request signal D_REQ has not been received from any of the modules (NO at Step S201), the operation control unit 12 repeats the process of Step S201 until the receipt of the request signal D_REQ. Meanwhile, if the operation control unit 12 determines that the request signal D_REQ has been received from any of the modules (YES at Step S201), the operation control unit 12 proceeds to the process of Step S202.

At Step S202, the operation control unit 12 calculates the current change rate of the domain 4. For example, the operation control unit 12 calculates the current change rate of the domain 4 resulting from the approval of the requested operation mode included in the request signal D_REQ. At subsequent Step S203, the operation control unit 12 determines, on the basis of the calculated current change rate, whether or not to approve the stop of the operation in the requested operation mode. For example, the operation control unit 12 determines whether or not the calculated current change rate does not exceed the allowable current change rate.

If the operation control unit 12 determines at Step S203 that the calculated current change rate does not exceed the allowable current change rate, the operation control unit 12 approves the operation stop processing in the requested operation mode (YES at Step S203), and proceeds to the process of Step S204. At Step S204, the operation control unit 12 transmits to the module which has transmitted the request signal D_REQ a response signal D_ACK approving the operation stop processing, and thereafter returns to the present control processing. Meanwhile, if the operation control unit 12 determines at Step S203 that the calculated current change rate exceeds the allowable current change rate, the operation control unit 12 disapproves the operation stop processing in the requested operation mode (NO at Step S203), and proceeds to the process of Step S205. At Step S205, the operation control unit 12 transmits to the module which has transmitted the request signal D_REQ a response signal D_ACK disapproving the operation stop processing, and thereafter returns to the present control processing. The module having the operation stop request disapproved by the operation control unit 12 changes the requested operation mode, and again transmits the operation stop request to the operation control unit 12.

As described above, also in the operation stop processing of a module in a domain, the operation control unit controls the operation mode of the module such that the current change rate of the entire domain does not exceed the allowable current change rate of the DC/DC power supply. By so doing, it is possible to suppress the fluctuation of the power supply voltage, and thus the potential difference between the domains 4 and 5 is prevented from exceeding the upper limit potential difference.

In the above-described first embodiment, description has been made that the domain 4 includes one or more modules, and that the operation start processing and the operation stop processing are performed between the modules and the operation control unit 12. It is needless to say that the domain 5 also includes one or more modules, and that operation start processing and operation stop processing similar to those described above are also performed between the modules of the domain 5 and the operation control unit 13.

As described above, in the semiconductor integrated circuit according to the first embodiment, a domain transmits to the corresponding operation control unit an operation change request representing a request for a change in operational state involving a change in current value. Then, upon receipt of the operation change request from the domain, the operation control unit calculates the current change rate of the entire domain resulting from the change in operation according to the operation change request. Then, if the current change rate does not exceed a specified value, the operation control unit approves the operation change request. Herein, the specified value is, for example, the allowable current change rate of the DC/DC power supply. Thereby, it is possible to suppress the fluctuation of the power supply voltage in the DC/DC power supply, and thus the potential difference between domains is prevented from exceeding the upper limit potential difference. With this configuration, when the respective power supply voltages supplied to the plurality of domains have the same value, it is possible to perform accurate transmission and reception of signals between the domains, even if the power supply voltages to the plurality of domains are not supplied from a single power supply.

Further, if the operation change request is disapproved by the operation control unit, the domain changes the amount of change in current value, and again transmits the operation change request to the operation control unit. Thereby, when the operation of the domain is changed, the potential difference between the domains is prevented from exceeding the upper limit potential difference.

[Second Embodiment]

Subsequently, a control method of a semiconductor integrated circuit according to a second embodiment will be described. In the second embodiment, description will be made of a method of increasing the allowable current change rate, which is a reference of the current change rate of the entire domain, to be higher than the allowable current change rate of the first embodiment.

An example of the configuration of the semiconductor integrated circuit according to the second embodiment will be first described with reference to FIG. 10.

Figure 10:
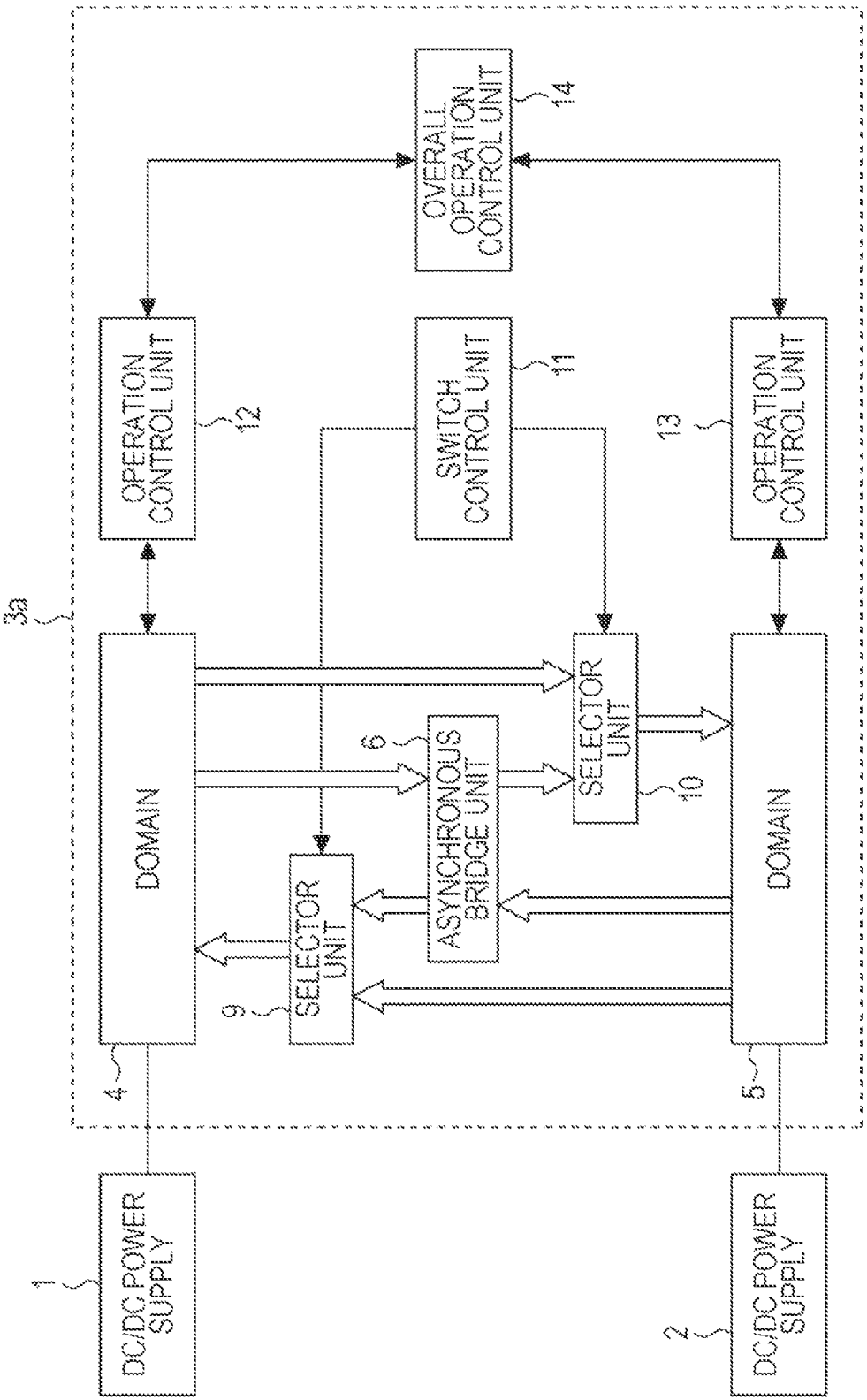
FIG. 10 is a diagram illustrating an example of the configuration of a semiconductor integrated circuit according to a second embodiment.

In FIG. 10, the same constituent components as the constituent components illustrated in FIG. 1 are assigned with the same reference numerals. As illustrated in FIG. 10, a semiconductor integrated circuit 3a according to the second embodiment includes an overall operation control unit 14, in addition to the constituent components of the semiconductor integrated circuit 3 according to the first embodiment. The overall operation control unit 14 controls the operation control units 12 and 13 for the domains 4 and 5 which transmit and receive signals therebetween. For example, the overall operation control unit 14 controls the operation control units 12 and 13 in the transmission and reception of signals between the domains 4 and 5, to thereby prevent the concurrent execution of the operation start processing of a module in one of the domains and the operation stop processing of a module in the other domain. Herein, the overall operation control unit 14 is realized by a program executed by an MPU, for example. Specific description will be made below.

Figure 11:
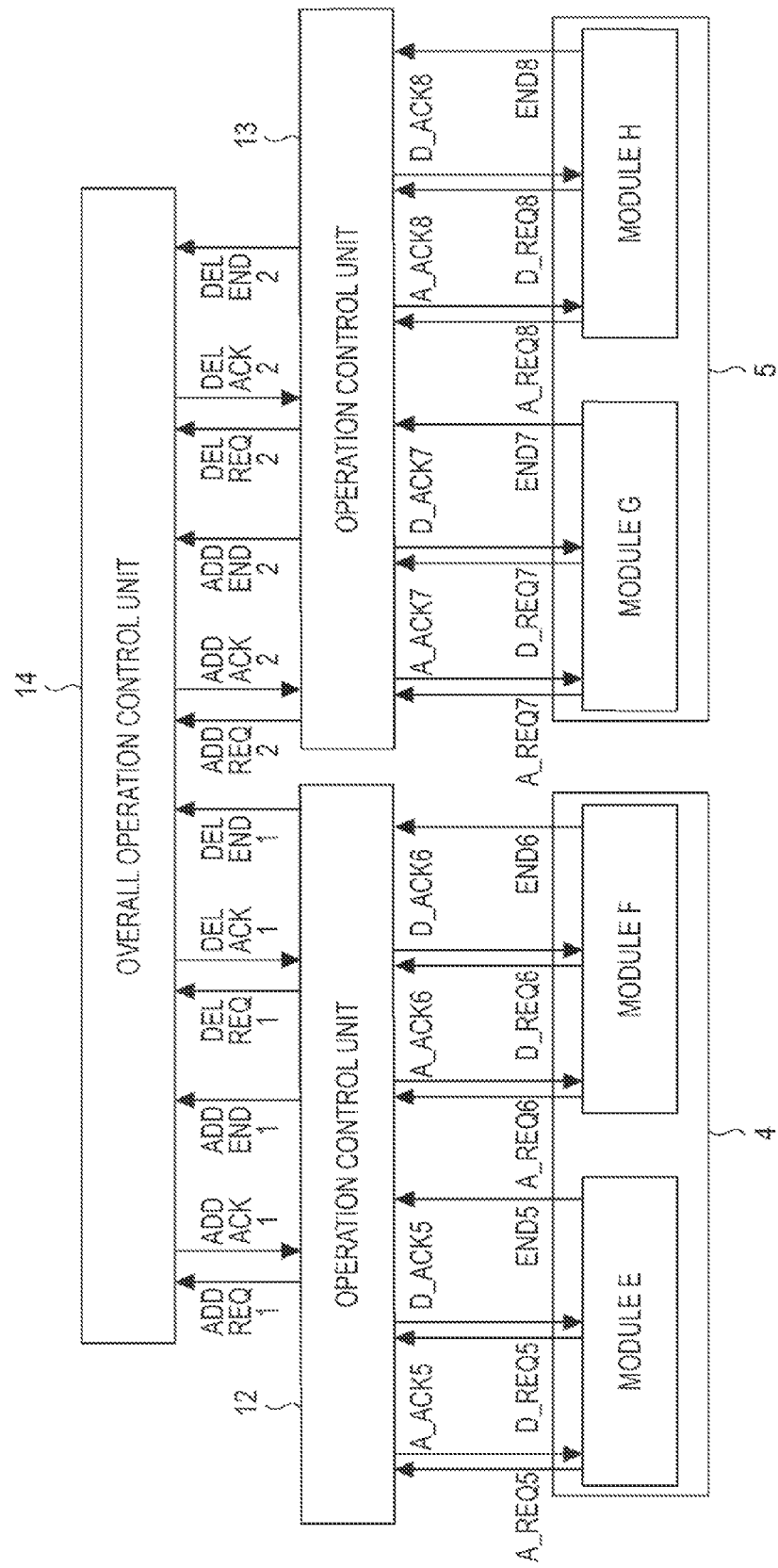
FIG. 11 is a diagram illustrating an example of the connection configuration between operation control units and an overall operation control unit.

FIG. 11 is a diagram illustrating an example of the connection configuration between the operation control units 12 and 13 and the overall operation control unit 14.

In FIG. 11, the domain 4 includes two modules E and F, and the domain 5 includes two modules G and H. Each of the modules E and F in the domain 4 transmits to the operation control unit 12 a request signal representing an operation change request, and receives from the operation control unit 12 a response signal representing a response to the operation change request. Each of the modules G and H in the domain 5 transmits to the operation control unit 13 a request signal representing an operation change request, and receives from the operation control unit 13 a response signal representing a response to the operation change request.

For example, when the modules E and F start the operation thereof, the modules E and F transmit to the operation control unit 12 request signals A_REQ5 and A_REQ6 each representing an operation start request, and receive from the operation control unit 12 response signals A_ACK5 and A_ACK6 responding thereto. Further, when the modules E and F stop the operation thereof, the modules E and F transmit to the operation control unit 12 request signals D_REQ5 and D_REQ6 each representing an operation stop request, and receive from the operation control unit 12 response signals D_ACK5 and D_ACK6 responding thereto. When the modules E and F complete the operation start processing or the operation stop processing, the modules E and F transmit to the operation control unit 12 notification signals END5 and END6 each representing the completion of the processing.

When the modules G and H start the operation thereof, the modules G and H transmit request signals A_REQ7 and A_REQ8 to the operation control unit 13, and receive from the operation control unit 13 response signals A_ACK7 and A_ACK8 responding thereto. Further, when the modules G and H stop the operation thereof, the modules G and H transmit request signals D_REQ7 and D_REQ8 to the operation control unit 13, and receive from the operation control unit 13 response signals D_ACK7 and D_ACK8 responding thereto. When the modules G and H complete the operation start processing or the operation stop processing, the modules G and H transmit to the operation control unit 13 notification signals END7 and END8 each representing the completion of the processing.

Upon receipt from either one of the modules E and F of a request signal A_REQ representing an operation start request, the operation control unit 12 transmits to the overall operation control unit 14 a request signal ADDREQ1 representing the operation start request of the module. Then, upon receipt from the overall operation control unit 14 of a response signal ADDACK1 representing the approval of the start of the operation of the module, the operation control unit 12 transmits a response signal A_ACK to the module which has transmitted the request signal A_REQ, and performs the operation start processing described in the first embodiment. Upon receipt of a notification signal END from either one of the modules E and F, the operation control unit 12 transmits to the overall operation control unit 14 a notification signal ADDEND1 notifying of the completion of the operation start processing of the module.

Meanwhile, upon receipt from either one of the modules E and F of a request signal D_REQ representing an operation stop request, the operation control unit 12 transmits to the overall operation control unit 14 a request signal DELREQ1 representing the operation stop request of the module. Then, upon receipt from the overall operation control unit 14 of a response signal DELACK1 representing the approval of the stop of the operation of the module, the operation control unit 12 transmits a response signal D_ACK to the module which has transmitted the request signal D_REQ, and performs the operation stop processing described in the first embodiment. Upon receipt of a notification signal END from either one of the modules E and F, the operation control unit 12 transmits to the overall operation control unit 14 a notification signal DELEND1 notifying of the completion of the operation stop processing of the module.

Similarly, upon receipt from either one of the modules G and H of a request signal A_REQ representing an operation start request, the operation control unit 13 transmits to the overall operation control unit 14 a request signal ADDREQ2 representing the operation start request of the module. Then, upon receipt from the overall operation control unit 14 of a response signal ADDACK2 representing the approval of the start of the operation of the module, the operation control unit 13 transmits a response signal A_ACK to the module which has transmitted the request signal A_REQ, and performs the operation start processing described in the first embodiment. Upon receipt of a notification signal END from either one of the modules G and H, the operation control unit 13 transmits to the overall operation control unit 14 a notification signal ADDEND2 notifying of the completion of the operation start processing of the module.

Meanwhile, upon receipt from either one of the modules G and H of a request signal D_REQ representing an operation stop request, the operation control unit 13 transmits to the overall operation control unit 14 a request signal DELREQ2 representing the operation stop request of the module. Then, upon receipt from the overall operation control unit 14 of a response signal DELACK2 representing the approval of the stop of the operation of the module, the operation control unit 13 transmits a response signal D_ACK to the module which has transmitted the request signal D_REQ, and performs the operation stop processing described in the first embodiment. Upon receipt of a notification signal END from either one of the modules G and H, the operation control unit 13 transmits to the overall operation control unit 14 a notification signal DELEND2 notifying of the completion of the operation stop processing of the module.

In the following, the numeral part of the sign representing a signal will be omitted, if the distinction between the operation control units is not made. For example, if the distinction between the operation control units is not made, a request signal representing an operation start request will be represented as "ADDREQ," and a response signal responding thereto will be represented as "ADDACK."

Upon receipt from one of the operation control units 12 and 13 of a request signal ADDREQ representing an operation start request, the overall operation control unit 14 checks whether or not the other operation control unit is performing the operation stop processing of a module. If the other operation control unit is not performing the operation stop processing, the overall operation control unit 14 transmits to the one of the operation control units a response signal ADDACK approving the operation start processing. Meanwhile, if the other operation control unit is performing the operation stop processing, the overall operation control unit 14 receives from the other operation control unit a notification signal DELEND representing the completion of the operation stop processing, and thereafter transmits to the one of the operation control units a response signal ADDACK approving the operation start processing.

Further, upon receipt from one of the operation control units 12 and 13 of a request signal DELREQ representing an operation stop request, the overall operation control unit 14 checks whether or not the other operation control unit is performing the operation start processing of a module. If the other operation control unit is not performing the operation start processing, the overall operation control unit 14 transmits to the one of the operation control units a response signal DELACK approving the operation stop processing. Meanwhile, if the other operation control unit is performing the operation start processing, the overall operation control unit 14 receives from the other operation control unit a notification signal ADDEND representing the completion of the operation start processing, and thereafter transmits to the one of the operation control units a response signal DELACK approving the operation stop processing.

Figure 12:
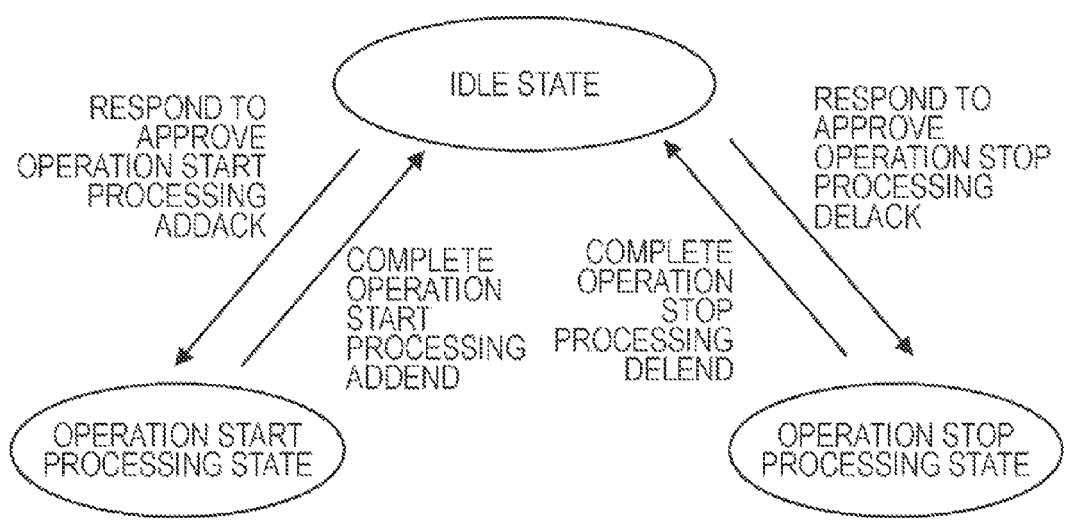
FIG. 12 is an example of a state transition diagram of the overall operation control unit.

FIG. 12 is an example of a state transition diagram of the overall operation control unit 14. The overall operation control unit 14 shifts between three states of an idle state, an operation start processing state, and an operation stop processing state. The idle state refers to a state in which the operation start processing and the operation stop processing of a module are not performed in either one of the operation control units 12 and 13. The operation start processing state refers to a state in which the operation start processing of a module is being performed in either one of the operation control units 12 and 13. The operation stop processing state refers to a state in which the operation stop processing of a module is being performed in either one of the operation control units 12 and 13.

For example, it is now assumed that the overall operation control unit 14 in the idle state has received from one of the operation control units 12 and 13 a request signal ADDREQ representing an operation start request. In this case, the overall operation control unit 14 transmits to the one of the operation control units a response signal ADDACK approving the operation start processing, and shifts to the operation start processing state. In this state, even if the overall operation control unit 14 receives from the other operation control unit a request signal DELREQ representing an operation stop request, the overall operation control unit 14 does not transmit a response signal DELACK responding to the request signal DELREQ until the return to the idle state. Upon receipt from the operation control unit which has transmitted the request signal ADDREQ of a signal ADDEND representing the completion of the operation start processing, the overall operation control unit 14 returns to the idle state.

Further, it is now assumed that the overall operation control unit 14 in the idle state has received from one of the operation control units 12 and 13 a request signal DELREQ representing an operation stop request. In this case, the overall operation control unit 14 transmits to the one of the operation control units a response signal DELACK approving the operation stop processing, and shifts to the operation stop processing state. In this state, even if the overall operation control unit 14 receives from the other operation control unit a request signal ADDREQ representing an operation start request, the overall operation control unit 14 does not transmit a response signal ADDACK responding thereto until the return to the idle state. Upon receipt from the operation control unit which has transmitted the request signal DELREQ of a signal DELEND representing the completion of the operation stop processing, the overall operation control unit 14 returns to the idle state.

Subsequently, description will be made of an example of operation start processing in which the module E starts the operation thereof in the domain 4.

When the module E starts the operation thereof, the module E transmits to the operation control unit 12 a request signal A_REQ5 representing an operation start request. Upon receipt of the request signal A_REQ5, the operation control unit 12 transmits to the overall operation control unit 14 a request signal ADDREQ1 representing the operation start request of the module.

Upon receipt of the request signal ADDREQ1 from the operation control unit 12, the overall operation control unit 14 transmits to the operation control unit 12 a response signal ADDACK1 approving the start of the operation of the module, if the overall operation control unit 14 is in the idle state or the operation start processing state. Meanwhile, if the overall operation control unit 14 is in the operation stop processing state, the overall operation control unit 14 does not transmit to the operation control unit 12 the response signal ADDACK1 approving the start of the operation of the module. In this case, after having returned to the idle state, the overall operation control unit 14 transmits to the operation control unit 12 the response signal ADDACK1 approving the start of the operation of the module. The overall operation control unit 14 transmits the response signal ADDACK1 to the operation control unit 12, and shifts to the operation start processing state. Upon receipt of the response signal ADDACK1, the operation control unit 12 transmits a response signal A_ACK5 to the module E, and performs the operation start processing of the module E by employing the method described in the first embodiment. Upon completion of the operation start processing, the module E transmits a notification signal ENDS to the operation control unit 12. Upon receipt of the notification signal ENDS, the operation control unit 12 transmits a notification signal ADDEND1 to the overall operation control unit 14. Upon receipt of the notification signal ADDEND1, the overall operation control unit 14 returns to the idle state.

Figure 13:
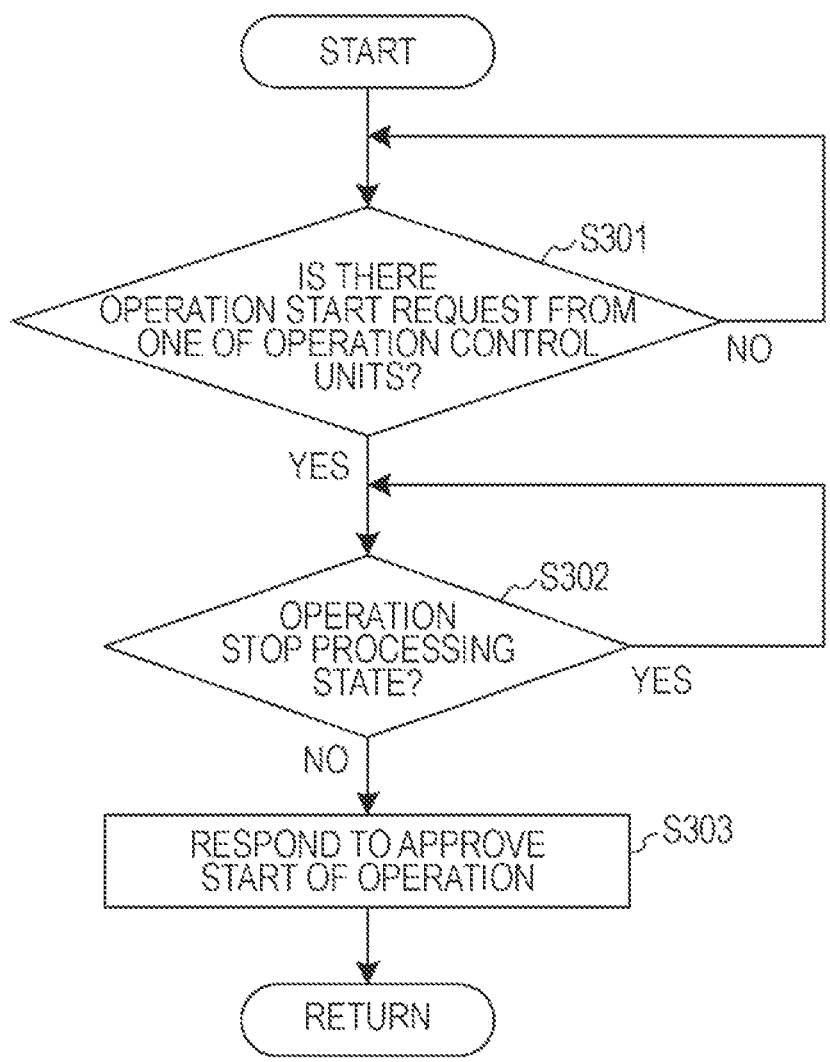
FIG. 13 is a flowchart illustrating control processing by the overall operation control unit performed in operation start processing of a module.

Control processing by the overall operation control unit 14 performed in the operation start processing of a module will now be described with reference to the flowchart illustrated in FIG. 13.

At Step S301, the overall operation control unit 14 first determines whether or not a request signal ADDREQ representing an operation start request of a module has been received from one of the operation control units 12 and 13. If the overall operation control unit 14 determines that the request signal ADDREQ has not been received (NO at Step S301), the overall operation control unit 14 repeats the process of Step S301 until the receipt of the request signal ADDREQ. Meanwhile, if the overall operation control unit 14 determines that the request signal ADDREQ has been received (YES at Step S301), the overall operation control unit 14 proceeds to the process of Step S302.

At Step S302, the overall operation control unit 14 determines whether or not the overall operation control unit 14 is in the operation stop processing state. If the overall operation control unit 14 determines that the overall operation control unit 14 is in the operation stop processing state (YES at Step S302), i.e., if the other operation control unit is performing the operation stop processing of a module, the overall operation control unit 14 repeats the process of Step S302. This process is a process of waiting for the completion of the operation stop processing of a module by the other operation control unit and the return of the overall operation control unit 14 to the idle state. Meanwhile, if the overall operation control unit 14 determines that the overall operation control unit 14 is not in the operation stop processing state (NO at Step S302), i.e., if the other operation control unit is not performing the operation stop processing of a module, the overall operation control unit 14 proceeds to the process of Step S303.

At Step S303, the overall operation control unit 14 transmits to the one of the operation control units a response signal ADDACK approving the start of the operation of the module in response to the request signal ADDREQ, and thereafter returns to the present control processing.

As described above, the overall operation control unit 14 disallows the operation start processing of a module in one of the domains during the operation stop processing of a module in the other domain. With this configuration, it is possible to prevent the potential difference between the domains 4 and 5 from being increased by the execution of the operation start processing of a module in one of the domains during the operation stop processing of a module in the other domain.

Subsequently, description will be made of an example of operation stop processing in which the module E stops the operation thereof in the domain 4.

When the module E stops the operation thereof, the module E transmits to the operation control unit 12 a request signal D_REQ5 representing an operation stop request. Upon receipt of the request signal D_REQ5, the operation control unit 12 transmits to the overall operation control unit 14 a request signal DELREQ1 representing the operation stop request of the module.

Upon receipt of the request signal DELREQ1 from the operation control unit 12, the overall operation control unit 14 transmits to the operation control unit 12 a response signal DELACK1 approving the stop of the operation of the module, if the overall operation control unit 14 is in the idle state or the operation stop processing state. Meanwhile, if the overall operation control unit 14 is in the operation start processing state, the overall operation control unit 14 does not transmit to the operation control unit 12 the response signal DELACK1 approving the stop of the operation of the module. In this case, after having returned to the idle state, the overall operation control unit 14 transmits to the operation control unit 12 the response signal DELACK1 approving the stop of the operation of the module. The overall operation control unit 14 transmits the response signal DELACK1 to the operation control unit 12, and shifts to the operation stop processing state. Upon receipt of the response signal DELACK1, the operation control unit 12 transmits a response signal D_ACK5 to the module E, and performs the operation stop processing of the module E by employing the method described in the first embodiment. Upon completion of the operation stop processing, the module E transmits a notification signal ENDS to the operation control unit 12. Upon receipt of the notification signal ENDS, the operation control unit 12 transmits a notification signal DELEND1 to the overall operation control unit 14. Upon receipt of the notification signal DELEND1, the overall operation control unit 14 returns to the idle state.

Figure 14:
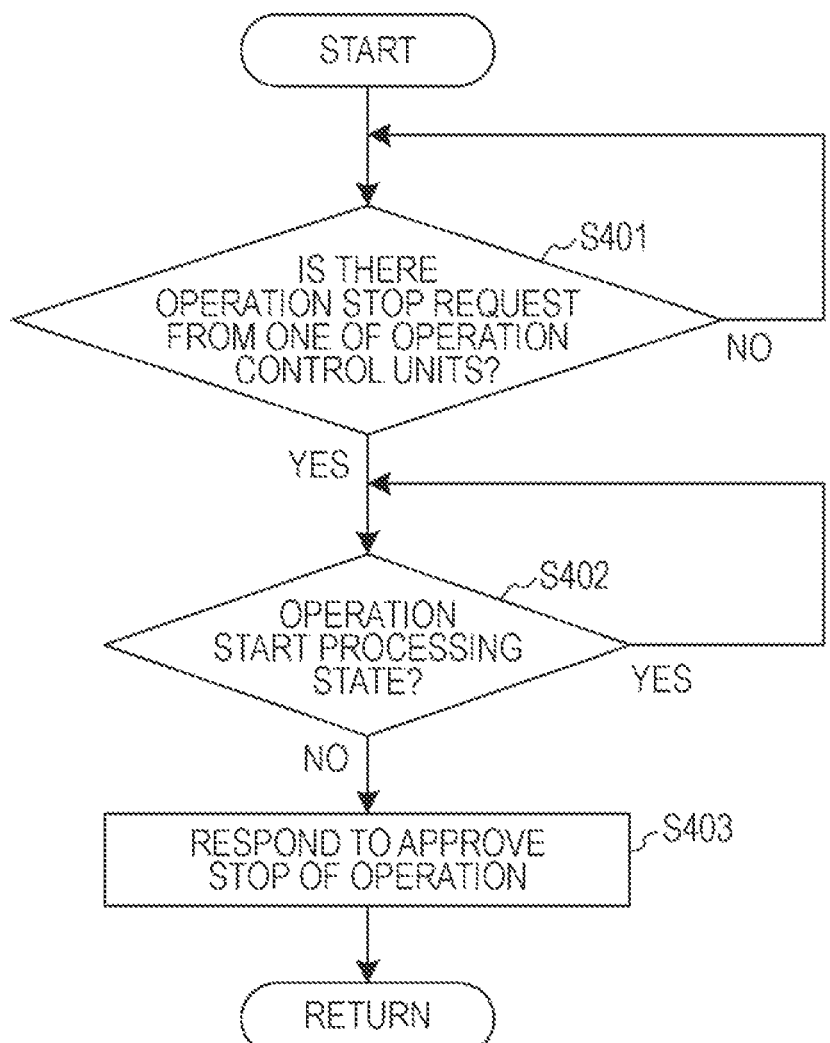
FIG. 14 is a flowchart illustrating control processing by the overall operation control unit performed in operation stop processing of a module.

Control processing by the overall operation control unit 14 performed in the operation stop processing of a module will now be described with reference to the flowchart illustrated in FIG. 14.

At Step S401, the overall operation control unit 14 first determines whether or not a request signal DELREQ representing an operation stop request of a module has been received from one of the operation control units 12 and 13. If the overall operation control unit 14 determines that the request signal DELREQ has not been received (NO at Step S401), the overall operation control unit 14 repeats the process of Step S401 until the receipt of the request signal DELREQ. Meanwhile, if the overall operation control unit 14 determines that the request signal DELREQ has been received (YES at Step S401), the overall operation control unit 14 proceeds to the process of Step S402.

At Step S402, the overall operation control unit 14 determines whether or not the overall operation control unit 14 is in the operation start processing state. If the overall operation control unit 14 determines that the overall operation control unit 14 is in the operation start processing state (YES at Step S402), i.e., if the other operation control unit is performing the operation start processing of a module, the overall operation control unit 14 repeats the process of Step S402. This process is a process of waiting for the completion of the operation start processing of a module by the other operation control unit and the return of the overall operation control unit 14 to the idle state. Meanwhile, if the overall operation control unit 14 determines that the overall operation control unit 14 is not in the operation start processing state (NO at Step S402), i.e., if the other operation control unit is not performing the operation start processing of a module, the overall operation control unit 14 proceeds to the process of Step S403.

At Step S403, the overall operation control unit 14 transmits to the one of the operation control units a response signal DELACK approving the stop of the operation of the module in response to the request signal DELREQ, and thereafter returns to the present control processing.

As described above, the overall operation control unit 14 disallows the operation stop processing of a module in one of the domains during the operation start processing of a module in the other domain. With this configuration, it is possible to prevent the potential difference between the domains 4 and 5 from being increased by the execution of the operation stop processing of a module in one of the domains during the operation start processing of a module in the other domain.

As understood from the foregoing description, in the transmission and reception of signals between the domains 4 and 5, the overall operation control unit 14 prevents the concurrent execution of the operation start processing of a module in one of the domains and the operation stop processing of a module in the other domain. Thereby, it is possible to prevent an increase in the potential difference between the domains 4 and 5 more effectively than in the method described in the first embodiment. The allowable current change rate described in the foregoing first embodiment is set to a value with which accurate transmission and reception of signals may be performed even in concurrent execution of the operation start processing of a module in one of the domains 4 and 5 and the operation stop processing of a module in the other domain. Meanwhile, the second embodiment prevents the concurrent execution of the operation start processing of a module in one of the domains and the operation stop processing of a module in the other domain. In the second embodiment, therefore, it is possible to set the allowable current change rate to be higher than the allowable current change rate described in the first embodiment. For example, in the foregoing first embodiment, the DC/DC power supply 1 for supplying a power supply voltage to the domain 4 has an allowable current change rate of 200%. Meanwhile, in the second embodiment, the allowable current change rate may be set to, for example, 280%.

With reference to FIG. 15, description will be made of examples of operation start processing and operation stop processing of a module, wherein the allowable current change rate is set to 280%. FIG. 15 is an example of a table representing the relationship between the operation modes of the modules in the domain 4 and the current values.

Description will be first made of an example of operation start processing in which the module E starts the operation thereof when only the module F is operating in the domain 4.

To start the operation, the module E first transmits to the operation control unit 12 a request signal A_REQ5 representing an operation start request with a requested operation mode of 1/1. Upon receipt of the request signal A_REQ5, the operation control unit 12 transmits to the overall operation control unit 14 a request signal ADDREQ1 representing the operation start request of the module. Upon receipt of a response signal ADDACK1 from the overall operation control unit 14, the operation control unit 12 calculates the current change rate of the domain 4. For example, only the module F is operating in the domain 4. Therefore, if the current value of the module F is 60 (mA), the current value of the entire domain 4 is 60 (mA). Meanwhile, the requested operation mode of the module E is 1/1. If the requested operation mode is approved, therefore, the current value of the entire domain 4 after the start of the operation of the module E is 60+100=160 (mA). Accordingly, the current change rate of the entire domain 4 between before and after the start of the operation of the module E is 160/60=2.67, i.e., 267(%).

In the second embodiment, the allowable current change rate of the DC/DC power supply 1 is 280%. Thus, the current change rate of the domain 4 in this case does not exceed the allowable current change rate of the DC/DC power supply 1. Therefore, the operation control unit 12 transmits to the module E a response signal A_ACK1 approving the start of the operation. Upon receipt of the response signal A_ACK1 approving the start of the operation, the module E starts the operation thereof in the approved operation mode of 1/1. That is, the module E starts the operation thereof with a current value of 100 (mA).

Subsequently, description will be made of an example of operation start processing in which the module E stops the operation thereof when the modules E and F are operating in the domain 4.

To stop the operation, the module E first transmits to the operation control unit 12 a request signal D_REQ5 representing an operation stop request with a requested operation mode of 0/1. Upon receipt of the request signal D_REQ5, the operation control unit 12 transmits to the overall operation control unit 14 a request signal DELREQ1 representing the operation stop request of the module. Upon receipt of a response signal DELACK1 from the overall operation control unit 14, the operation control unit 12 calculates the current change rate of the domain 4. For example, the modules E and F are operating in the domain 4. Therefore, the current value of the entire domain 4 is 100+60=160 (mA). Meanwhile, the requested operation mode of the module E is 0/1. If the requested operation mode is approved, therefore, the current value of the entire domain 4 after the stop of the operation of the module E is 160−100=60 (mA). Accordingly, the current change rate of the entire domain 4 between before and after the stop of the operation of the module E is 160/60=2.67, i.e., 267(%).

In the second embodiment, the allowable current change rate of the DC/DC power supply 1 is 280%. Thus, the current change rate of the domain 4 in this case does not exceed the allowable current change rate of the DC/DC power supply 1. Therefore, the operation control unit 12 transmits to the module E a response signal D_ACK1 approving the stop of the operation. Upon receipt of the response signal D_ACK1 approving the stop of the operation, the module E stops the operation thereof.

In the above-described second embodiment, description has been made of an example in which the operation start processing and the operation stop processing are performed between the domain 4 and the operation control unit 12. It is needless to say that operation start processing and operation stop processing similar to those described above are also performed between the domain 5 and the operation control unit 13.

As described above, in the semiconductor integrated circuit according to the second embodiment, the overall operation control unit 14 prevents the concurrent execution of the operation start processing of a module in one of the domains and the operation stop processing of a module in the other domain. That is, the overall operation control unit 14 prevents the concurrent generation of an increase in current value due to the operation start processing of a module in one of the domains and a reduction in current value due to the operation stop processing of a module in the other domain. Thereby, it is possible to set the allowable current change rate to be higher than the allowable current change rate of the semiconductor integrated circuit according to the first embodiment. In the operation start processing and the operation stop processing, therefore, it is possible to reduce the number of changes in the clock frequency ratio. That is, it is possible to reduce the time for the operation start processing and the operation stop processing more in the second embodiment than in the first embodiment.

The embodiment is not limited thereto. The above configuration may be modified such that, every time the current value of a domain is increased or reduced, the overall operation control unit 14 receives a request signal from an operation control unit to prevent the concurrent generation of an increase in current value of one of the domains and a reduction in current value of the other domain. For example, the operation control units 12 and 13 may transmit a request signal to the overall operation control unit 14 in every process of changing the requested operation mode, for example, in every process of changing the clock frequency ratio of a module, as well as in the start of the operation start processing or the operation stop processing of a module in a domain. Then, on the basis of the request signal, the overall operation control unit 14 may disallow, during the process of changing the clock frequency ratio involving an increase in current value of one of the domains, the process of changing the clock frequency ratio involving a reduction in current value of the other domain. This configuration also allows the allowable current change rate to be higher than the allowable current change rate of the semiconductor integrated circuit according to the first embodiment.

Embodiments are not limited to the above-described embodiment examples, and may be altered within a scope not departing from the gist or concept of the invention read from the entirety of the claims and the specification. For example, each of the semiconductor integrated circuits according to the above-described first and second embodiments is provided with two domains. However, the configuration is not limited thereto. The above-described first and second embodiments are also applicable to, instead of the above configuration, a semiconductor integrated circuit provided with three or more domains, two of which communicate with each other. Further, the asynchronous bridge unit 6 is provided in the semiconductor integrated circuits 3 and 3a according to the first and second embodiments. However, the configuration is not limited thereto. It is needless to say that the first and second embodiments are also applicable to, instead of the above configuration, a semiconductor integrated circuit which is not provided with the asynchronous bridge unit 6, and which transmits and receives signals when the respective power supply voltages supplied to the domains have the same value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A semiconductor integrated circuit, comprising:
a plurality of domains each supplied power supply voltage from corresponding one of a plurality of power supply units; and a plurality of operation control units each connected to corresponding one of the plurality of domains and controlling an operational state of the corresponding domain, wherein each of the domain transmits an operation change request to the corresponding operation control unit, the operation change request representing a request for a change of the operational state with a change in current value of the domain, and the operation control unit calculates a current change rate of the domain resulted from the change of operational state upon receiving the operation change request, and transmits a response signal approving the change of operational state to the corresponding domain in case that the current change rate is within a specified value.

2. The semiconductor integrated circuit according to claim 1, wherein in case that the operation change request is disapproved by the operation control unit, the domain changes the amount of change in current value and transmits the operation change request to the operation control unit.

3. The semiconductor integrated circuit according to claim 1, further comprising:

an overall operation control unit that controls the plurality of the operation control units, wherein the overall operation control unit prevents a concurrent generation of an increase in current value of one of the domains and a decrease in current value of another of the plurality of domains.

4. The semiconductor integrated circuit according to claim 1, further comprising:

an asynchronous bridge unit, provided between two domains, for receiving and transmitting data between the two domains; and a switch control unit for switching between a data path via the asynchronous bridge unit and a data path bypassing the asynchronous bridge unit, wherein the switch control unit switches to the data path bypassing the asynchronous bridge unit in case that the power supply voltage of one of the two domains is equal to the power supply voltage of the other domain.

5. The semiconductor integrated circuit according to claim 1, wherein the domain includes a plurality of modules, and each of the plurality of the modules transmits the operation change request to the operation control unit.

6. The semiconductor integrated circuit according to claim 5, wherein the operation change request represents that the module starts the operation or that the module stops the operation.

7. The semiconductor integrated circuit according to claim 5, wherein the module changes the current value by dividing the clock frequency of its operation.

* * * * *